(12) United States Patent
Ahmed Salem et al.

(10) Patent No.: US 11,811,431 B2
(45) Date of Patent: *Nov. 7, 2023

(54) ENHANCED FREQUENCY COMPRESSION FOR OVERHEAD REDUCTION FOR CSI REPORTING AND USAGE

(71) Applicant: Nokia Technologies Oy, Espoo (FI)

(72) Inventors: Rana Ahmed Salem, Munich (DE); Filippo Tosato, Bures sur Yvette (FR); Marco Maso, Issy les Moulineaux (FR); William Hillery, Lafayette, IN (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,958

(22) Filed: Jul. 12, 2022

(65) Prior Publication Data
US 2022/0352956 A1 Nov. 3, 2022

Related U.S. Application Data

(63) Continuation of application No. 16/705,368, filed on Dec. 6, 2019, now Pat. No. 11,424,807.
(Continued)

(51) Int. Cl.
 *H04B 7/06* (2006.01)
 *H04B 7/0456* (2017.01)
 *H04L 1/1607* (2023.01)

(52) U.S. Cl.
 CPC ......... *H04B 7/0663* (2013.01); *H04B 7/0456* (2013.01); *H04B 7/0626* (2013.01); *H04L 1/1614* (2013.01)

(58) Field of Classification Search
 CPC .. H04B 7/0663; H04B 7/0456; H04B 7/0626; H04L 1/1614
 See application file for complete search history.

(56) References Cited

U.S. PATENT DOCUMENTS

2019/0115960 A1 4/2019 Jiang et al.
2021/0036756 A1* 2/2021 Wu ..................... H04B 7/0658

FOREIGN PATENT DOCUMENTS

CN 102088333 A 6/2011
CN 107925466 A 4/2018

OTHER PUBLICATIONS

3GPP TSG RAN WG1 Meeting #94b R1-1810884 (Year: 2018).*
(Continued)

*Primary Examiner* — Gary Mui
*Assistant Examiner* — Stephen N Steiner
(74) *Attorney, Agent, or Firm* — Nokia Technologies Oy

(57) ABSTRACT

In accordance with an example embodiment of the present invention, a method comprising: selecting, by a user equipment, a subset of linear combination coefficients from a linearized two-dimensional matrix having columns of frequency domain components and rows of spatial beams components for channel state information determination, wherein the number of linear combination coefficients in the subset is less than all of the linear combination coefficients; determining indication comprising information associated with column indices of the selected subset of linear combination coefficients from the linearized two-dimensional matrix, wherein the indication excludes the index of the column with lowest index of the linearized two-dimensional matrix; determining compressed channel state information comprising locations in the linearized two-dimensional matrix of the subset of linear combination coefficients and corresponding values of the linear combination coefficients at those locations; and reporting, from the user equipment toward the base station, the compressed channel state information.

20 Claims, 6 Drawing Sheets

Related U.S. Application Data

(60) Provisional application No. 62/778,011, filed on Dec. 11, 2018.

(56) References Cited

OTHER PUBLICATIONS

3GPP TSG RAN WG1 Meeting #90 R1-1712295 (Year: 2017).*
"WI Proposal on NR MIMO Enhancements", 3GPP TSG RAN Meeting #80, RP-181453, Agenda : 9.1.1, Samsung, Jun. 11-14, 2018, 5 pages.
"WF on Type I and II CSI Codebooks", 3GPP TSG-RAN WG1 #89, R1-1709232, Agenda: 7.1.2.3, May 15-19, 2017, 24 pages.
"CSI Enhancements for MU-MIMO Support", 3GPP TSG RAN WG1 Meeting #94-bis, R1-1811406, Agenda : 7.2.8.1, Oct. 8-12, 2018, 13 pages.
"Discussion on CSI enhancement for MU-MIMO", 3GPP TSG RAN WG1 Meeting #94bis, R1-1810103, Agenda : 7.2.8.1, Huawei, Oct. 8-12, 2018, 10 pages.
"CSI Enhancement for MU-MIMO", 3GPP TSG RAN WG1 Meeting #94b, R1-1810884, Oct. 8-12, 2018, pp. 1-6.
"Overhead Reduction for Type II CSI", 3GPP TSG RAN WG1 Meeting #90, R1-1712295, Agenda : 6.1.2.2.3, ZTE, Aug. 21-25, 2017, 6 pages.
"Chairman's notes of AI 5.2.4 on Further enhancements to Coordinated Multi-Point Operation for LTE", 3GPP TSG RAN WG1 Meeting #90, R1-1715129, Agenda : 5.2.4, Ad-Hoc chair (Intel), Aug. 21-25, 2017, 5 pages.
Extended European Search Report received for corresponding European Patent Application No. 19214196.8, dated Mar. 19, 2020, 7 pages.
"Discussion on CSI enhancement", 3GPP TSG RAN WGl Meeting #95, R1-1812242, Agenda : 7.2.8.1, Huawei, Nov. 12-16, 2018, 8 pages.
"CSI feedback overhead reduction for MU-MIMO enhancements", 3GPP TSG RAN WG1 Meeting #95, R1-1813488, Agenda : 7.2.8.1, Nokia, Nov. 12-16, 2018, 10 pages.
Office action received for corresponding European Patent Application No. 19214196.8, dated Apr. 21, 2021, 7 pages.
Non-Final Office action received for corresponding U.S. Appl. No. 16/705,368, dated Aug. 13, 2021, 17 pages.
Final Office action received for corresponding U.S. Appl. No. 16/705,368, dated Feb. 11, 2022, 17 pages.
Office action received for corresponding Chinese Patent Application No. 201911258342.2, dated Mar. 3, 2022, 8 pages of office action and 7 pages of translation available.
Notice of Allowance received for corresponding U.S. Appl. No. 16/705,368, dated Apr. 29, 2022, 8 pages.
Office action received for corresponding European Patent Application No. 19214196.8, dated Feb. 14, 2023, 8 pages.
"CSI Enhancements for MU-MIMO", 3GPP TSG RAN WG1 Ad-Hoc Meeting #AH1901, R1-1900690, Agenda : 7.2.8.1, Nokia, Jan. 21-25, 2019, 17 pages.

* cited by examiner $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$$

- Long-term 2D DFT Beam
- Beam power scaling factor wideband
- Beam power scaling factor subband
- Beam combining coefficient

FIG. 2

ENHANCED FREQUENCY COMPRESSION FOR OVERHEAD REDUCTION FOR CSI REPORTING AND USAGE

CROSS REFERENCE TO RELATED APPLICATION

This application is a continuation of U.S. application Ser. No. 16/705,368, filed Dec. 6, 2019, which claims priority to U.S. Provisional Application No. 62/778,011, filed Dec. 11, 2018, which is incorporated herein by reference in its entirety.

TECHNICAL FIELD

This invention relates generally to channel state information (CSI) and, more specifically, relates to frequency compression for CSI reporting and usage.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

In Release (Rel.) 15, New Radio (NR) type II Channel State Information (CSI) is an eigenvector approximation scheme for CSI feedback, defined up to rank=2 transmission. This limitation is mostly due to the large feedback overhead that would result from a higher-rank CSI feedback. Indeed, the feedback overhead of NR type II would scale linearly with the rank of the CSI feedback, if the legacy framework were simply extended. This would require a significant increase of the necessary uplink resources to perform the feedback. Despite this limitation, a legacy Type II codebook can achieve significant performance enhancement over Long Term Evolution (LTE) codebooks at the cost of higher feedback overhead as compared to the latter. Hence for further extension beyond rank=2 transmission, the feedback overhead has to be sufficiently reduced.

In the approved MIMO Work Item (WI) for third Generation Partnership Project (3GPP) Rel. 16, the Multiple User-MIMO (MU-MIMO) enhancements are listed as the following (see RP-181453, New Draft WI proposal on NR MIMO enhancements, Samsung):

"Extend specification support in the following areas [RAN1]
  Enhancements on MU-MIMO support:
    Specify overhead reduction, based on Type II CSI feedback, taking into account the tradeoff between performance and overhead
    Perform study and, if needed, specify extension of Type II CSI feedback to rank >2"

Accordingly, any solutions which aim at designing an extension of Type II CSI feedback to achieve an overhead reduction with respect to legacy Type II and (or) support to rank >2 transmissions is naturally aligned with the scope of the WI for 3GPP Rel. 16.

One issue that remains is how to design such solutions.

SUMMARY

Various aspects of examples of the invention are set out in the claims.

According to a first aspect of the present invention, a method comprising: compressing, in a user equipment having multiple receive antennas and communicating with a base station having multiple transmit antennas, channel state information, the compressing comprising: selecting a subset of linear combination coefficients from a linearized two-dimensional matrix having columns of frequency domain components and rows of spatial beams components for channel state information determination, wherein the number of linear combination coefficients in the subset is less than all of the linear combination coefficients; determining indication comprising information associated with column indices of the selected subset of linear combination coefficients from the linearized two-dimensional matrix, wherein the indication excludes the index of the column with lowest index of the linearized two-dimensional matrix; determining compressed channel state information comprising locations in the linearized two-dimensional matrix of the subset of linear combination coefficients and corresponding values of the linear combination coefficients at those locations, the compressed channel state information further comprises the determined indication; and reporting, from the user equipment toward the base station, the compressed channel state information.

According to a second aspect of the present invention, an apparatus comprising: at least one processor; and at least one memory including computer program code, wherein the at least one memory and the computer program code are configured, with the at least one processor, to cause the apparatus to at least: compressing, in the apparatus having multiple receive antennas and communicating with a base station having multiple transmit antennas, channel state information, the compressing comprising: selecting a subset of linear combination coefficients from a linearized two-dimensional matrix having columns of frequency domain components and rows of spatial beams components for channel state information determination, wherein the number of linear combination coefficients in the subset is less than all of the linear combination coefficients; determining indication comprising information associated with column indices of the selected subset of linear combination coefficients from the linearized two-dimensional matrix, wherein the indication excludes the index of the column with lowest index of the linearized two-dimensional matrix; determining compressed channel state information comprising locations in the linearized two-dimensional matrix of the subset of linear combination coefficients and corresponding values of the linear combination coefficients at those locations, the compressed channel state information further comprises the determined indication; and reporting, from the user equipment toward the base station, the compressed channel state information.

According to a third aspect of the present invention, A non-transitory computer storage medium encoded with a computer program, the program comprising instructions that when executed by one or more computers cause the one or more computers to perform operations comprising: compressing, in a user equipment having multiple receive antennas and communicating with a base station having multiple transmit antennas, channel state information, the compressing comprising: selecting a subset of linear combination coefficients from a linearized two-dimensional matrix having columns of frequency domain components and rows of spatial beams components for channel state information determination, wherein the number of linear combination coefficients in the subset is less than all of the linear combination coefficients; determining indication comprising information associated with column indices of the selected subset of linear combination coefficients from the linearized two-dimensional matrix, wherein the indication excludes the index of the column with lowest index of the linearized two-dimensional matrix; determining compressed channel state information comprising locations in the linearized two-dimensional matrix of the subset of linear combination coefficients and corresponding values of the linear combination coefficients at those locations, the compressed channel state information further comprises the determined indication; and reporting, from the user equipment toward the base station, the compressed channel state information.

According to a fourth aspect of the present invention, a method comprising: receiving in a base station having multiple transmit antennas and from a user equipment having multiple receive antennas, reporting of compressed channel state information comprising locations in a linearized two-dimensional matrix of a subset of linear combination coefficients and corresponding values of the linear combination coefficients at those locations, the linearized two-dimensional matrix having columns of frequency domain components and rows of spatial beams components for channel state information determination, wherein the number of linear combination coefficients in the subset is less than all of the linear combination coefficients, and the compressed channel state information comprises indication comprising information associated with column indices of the subset of linear combination coefficients from the linearized two-dimensional matrix, wherein the indication excludes the index of the column with lowest index of the linearized two-dimensional matrix; and reconstructing channel state information from the compressed channel state information by using at least the locations in the linearized two-dimensional matrix and the corresponding values of the linear combination coefficients at those locations to determine the linearized two-dimensional matrix.

According to a fifth aspect of the present invention, an apparatus comprising: at least one processor; and at least one memory including computer program code, wherein the at least one memory and the computer program code are configured, with the at least one processor, to cause the apparatus to at least: receive in the apparatus having multiple transmit antennas and from a user equipment having multiple receive antennas, reporting of compressed channel state information comprising locations in a linearized two-dimensional matrix of a subset of linear combination coefficients and corresponding values of the linear combination coefficients at those locations, the linearized two-dimensional matrix having columns of frequency domain components and rows of spatial beams components for channel state information determination, wherein the number of linear combination coefficients in the subset is less than all of the linear combination coefficients, and the compressed channel state information comprises indication comprising information associated with column indices of the subset of linear combination coefficients from the linearized two-dimensional matrix, wherein the indication excludes the index of the column with lowest index of the linearized two-dimensional matrix; and reconstruct channel state information from the compressed channel state information by using at least the locations in the linearized two-dimensional matrix and the corresponding values of the linear combination coefficients at those locations to determine the linearized two-dimensional matrix.

BRIEF DESCRIPTION OF THE DRAWINGS

In the attached Drawing Figures:

FIG. 2 illustrates components of a matrix used as a final weighting vector at a RAN node 170;

DETAILED DESCRIPTION OF THE DRAWINGS

Figure 1:
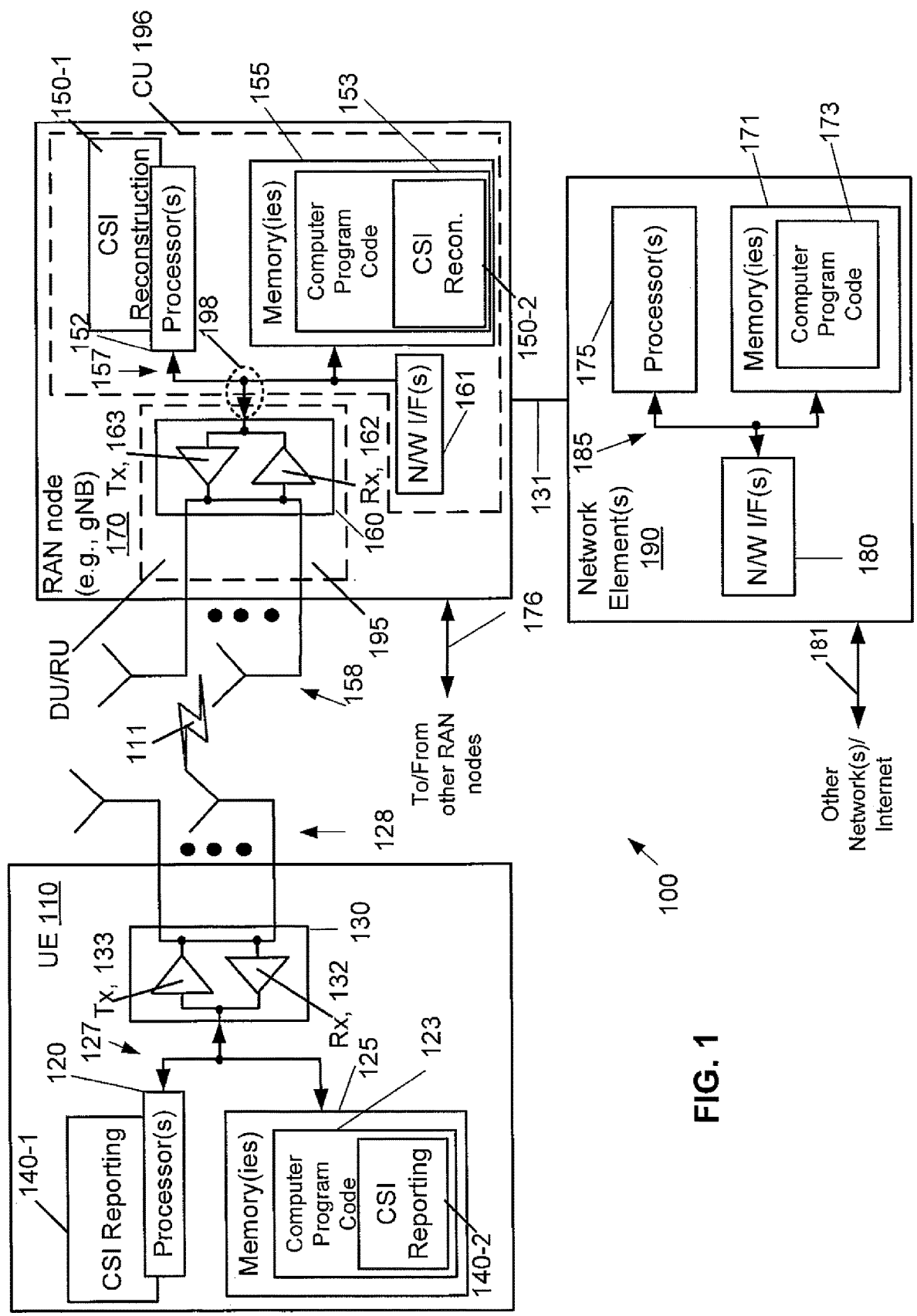
FIG. 1 is a block diagram of one possible and non-limiting exemplary system in which the exemplary embodiments may be practiced.

The following abbreviations that may be found in the specification and/or the drawing figures are defined as follows:
% percent
2D two-dimensional
3GPP third generation partnership project
5G fifth generation
5GC 5G core network
AMF access and mobility management function
CDF cumulative distribution function
coeff coefficient
comp compression
CSI channel state information
CSI-RS channel state information-reference signal
CU central unit
dB decibels
DCT discrete cosine transform
DFT discrete Fourier transform
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FD frequency domain FDD frequency division duplex
gNB (or gNodeB) base station for 5G/NR, i.e., a node providing at least
NR user plane, and connected via the NG interface to the 5GC
I/F interface
LTE long term evolution
MAC medium access control
MIMO multiple input, multiple output
MME mobility management entity
ng or NG new generation
ng-eNB or NG-eNB new generation eNB
NR new radio
N/W or NW network
PDCP packet data convergence protocol
PMI Precoding matrix indicator
PHY physical layer
RAN radio access network
RB resource block
recon. reconstruction
Rel. release
RLC radio link control
RRH remote radio head
RRC radio resource control
RU radio unit
Rx receiver
SB subband
SD spatial domain
SDAP service data adaptation protocol
SGW serving gateway
SINR signal-to-interference-plus-noise ratio
SMF session management function
TS technical specification
Tx transmitter
UE user equipment (e.g., a wireless, typically mobile device)
UPF user plane function
WB wide band
WI work item
WID work item description The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for enhanced frequency compression for overhead reduction for CSI reporting and usage. Additional description of these techniques is presented after a system into which the exemplary embodiments may be used is described. For ease of reference, this disclosure is divided into different sections.

I. Exemplary System Description

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a CSI reporting module 140, comprising one of or both parts 140-1 and/or 140-2, which may be implemented in a number of ways. The CSI reporting module 140 may be implemented in hardware as CSI reporting module 140-1, such as being implemented as part of the one or more processors 120. The CSI reporting module 140-1 may be implemented also as an integrated circuit or through other hardware such as a programmable gate array. In another example, the CSI reporting module 140 may be implemented as CSI reporting module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a CSI reconstruction module 150, comprising one of or both parts 150-1 and/or 150-2, which may be implemented in a number of ways. The CSI reconstruction module 150 may be implemented in hardware as CSI reconstruction module 150-1, such as being implemented as part of the one or more processors 152. The CSI reconstruction module 150-1 may be implemented also as an integrated circuit or through other hardware such as a programmable gate array. In another example, the CSI reconstruction module 150 may be implemented as CSI reconstruction module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the CSI reconstruction module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a distributed unit (DU) 195 for gNB implementation for 5G (e.g., or a remote radio head (RRH) 195 for LTE), with the other elements of the RAN node 170 possibly being physically in a different location from the DU 915 (or RRH), and the one or more buses 157 could be implemented in part as, e.g., fiber optic cable or other suitable network connection to connect the other elements (e.g., CU 196, or gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

It is noted that in the description below, the RAN node 170 will be referred to as a gNB 170. This is not meant to be limiting, as other RAN nodes may be used, but is for ease of reference.

Having thus introduced one suitable but non-limiting technical context for the practice of the exemplary embodiments of this invention, the exemplary embodiments will now be described with greater specificity.

II. Overview of NR type II CSI

This section contains an overview of NR type II CSI. See also R1-1709232, "WF on Type I and II CSI codebooks", RAN1 #89, May 2017.

The final weighting vector at the gNB 170 is a weighted linear combination of L orthogonal beams per polarization as written below:

$$\tilde{w}_{r,l} = \sum_{i=0}^{L-1} b_{k_1^{(i)},k_2^{(i)}} \cdot p_{r,l,i}^{(WB)} \cdot p_{r,l,i}^{(SB)} \cdot c_{r,l,i}.$$

FIG. 2 illustrates the four components of this matrix: a long-term 2D DFT beam; a beam power scaling factor for wideband (WB); a beam power scaling factor for subband (SB); and a beam combining coefficient (coeff).

Steps to build the matrix $\tilde{w}_{r,l}$ are the following.

1. Build the grid-of-beam matrix $W_1$ of size $2N_1/N_2 \times 2L$, by choosing L orthogonal vectors/beams per polarization r from a set of oversampled $O_1O_2N_1N_2$ DFT beams, where $N_1$ and $N_2$ are the number of antenna ports in horizontal and vertical domains, and $O_1$ and $O_2$ are the oversampling factors in both dimensions. This collection of vectors can be used to approximate the eigenvectors of the channel covariance matrix by means of suitable weighted linear combinations. This operation achieves a compression in the spatial domain (SD), hence the resulting 2L beams are also referred to as SD components.
2. Build linear combination subband matrix $W_2$ via the following: for every subband, calculate the coefficients to be used for the weighted linear combination of the columns of $W_1$, yielding the aforementioned approximation of the/strongest eigenvectors of the channel covariance matrix.
3. Quantize linear combining coefficients, as follows: the correlation between the coefficients of the different $W_2$ across all the subbands is exploited to achieve a reduction of the overall number of coefficients to feed back by means of a differential wideband and subband quantization.

As is clear in step 2 above and in an overhead Table in R1-1709232, this approach causes the number of combining coefficients to increase linearly with the number of layers transmitted and with the number of subbands. Accordingly, increasing the rank of the CSI feedback and (to a limited extent) the channel bandwidth size can yield an unbearable feedback overhead for a multi-user NR MIMO system.

In this context, if the structure the legacy Type II codebook must be respected to comply with current 3GPP trends, then only three possible directions can be explored to reduce the overall number of coefficients to be fed back by each UE (on average or instantaneously or both):

1. Reducing the rank of the CSI feedback;
2. Decreasing the number of subbands; or
3. Increasing the CSI feedback periodicity.

However, none of these directions seems to offer a robust means to achieve the goals of the WI for 3GPP Rel. 16. Instead, consider the following:

1. Reducing the rank of the CSI feedback goes against the second goal of the WI, and would implicitly entail that only rank-1 feedback can be performed.
2. Decreasing the number of subbands results in subband size increase, in turn impacting negatively the CSI quality and resolution.
3. Increasing the CSI feedback periodicity implies a less timely reporting, in turn incurring the risk of CSI aging and worsened downlink performance.

Others have attempted to address these issues. For instance, see the following: R1-1811406, "CSI Enhancements for MU-MIMO Support", RAN1 #94bis, Nokia, October 2018; R1-1810103, "Discussion on CSI enhancement for MU-MIMO", RAN1 #94bis, Huawei, October 2018; and R1-1810884, "CSI enhancement for MU-MIMO", RAN1 #94bis, Samsung, October 2018. The directions discussed in these references aim at exploiting the frequency domain correlation in the size-$2L \times N_{sb}$ matrix $W_2$ by applying DFT compression on top of the matrix $W_2$. Hence a compression matrix $W_f$ of size $N_{sb} \times M$ is selected from the columns of a DFT codebook, where $M < N_{sb}$ and applied to each layer l as follows to obtain a size-$2L \times M$ matrix of linear combination coefficients:

$$C_l = W_2 W_f.$$

We refer to the columns inside $W_f$ as frequency domain (FD) components. These columns may be chosen, for example, from a discrete Fourier transform (DFT) or discrete cosine transform (DCT) codebook and they form an orthogonal subset of the basis set defined in the codebook. In this regard, it is worth noting that such codebook may be oversampled. In other words, and assuming a DFT codebook is used to devise $W_f$, then a general representation of such oversampled codebook would be written as:

$$\begin{cases} [F]_{nm} = \frac{1}{\sqrt{N_3}} e^{-\frac{j2\pi nm}{O_3 N_{sb}}}, \\ n \in [0, 1, \ldots, N_{sb} - 1] \\ m \in [0, 1, \ldots, O_3 N_{sb} - 1] \end{cases}$$

where $O_3$ is the oversampling factor. According to this representation, a regular DFT codebook would be used if $O_3 = 1$. In this context, $W_f$ is obtained by selecting a suitable and orthogonal set of M columns out of the $O_3 N_{sb}$ available ones.

III. Overview of Exemplary Embodiments

In an exemplary embodiment, this basis subset selection, i.e., the codebook indices of the selected FD components inside $W_f$, i.e., the M values of the codebook index m associated to the selected codebook vectors, may be signaled to the gNB (as RAN node 170) in addition to the complex coefficients inside $C_l$ (e.g., quantized). The compression is achieved since $M < N_{sb}$.

In exemplary embodiments, we propose two enhancements to the frequency compression scheme:

1. Given prior knowledge about the structure and properties of $W_2$, we propose to always include in the set of reported quantized coefficients at least one or more component coefficients of the $x_f$ columns of the matrix $C_l$ for which the corresponding codebook index m is the lowest. In this regard, we note that it is assumed that information on the value of $x_f$ is available both at the UE and gNB (e.g., by previous agreement between the UE 110 and the gNB 170, by specification, or because of feedback from the UE 110 to the gNB 170). For instance, this implies that, when the codebook is not oversampled (i.e., $O_3 = 1$), at least one or more component coefficients of the column of $C_l$ associated to the codebook index m=0 are always included in the set of reported quantized coefficients. In particular, we note that each component coefficient of such column of $C_l$ would carry the wideband (WB) average value of the corresponding rows of $W_2$ or, in other terms, such column of $C_l$ would carry the average wideband (WB) information related to the matrix $W_2$ across different spatial beams. It is worth observing that the same observation does not necessarily hold when the codebook is oversampled, i.e., $O_3 > 1$. In fact, when an oversampled codebook is adopted, some instances of the matrix $C_l$ may be composed only of columns whose associated codebook index is m>0, hence no column would carry the average WB information related to the matrix $W_2$ across different spatial beams in this case (strictly speaking). More precisely, if such a situation occurs, the lowest codebook index associated to the columns of $C_l$ (and $W_f$) could be seen as an offset between such index and the index of the actual WB component, e.g., m=0). Accordingly, we will still refer to the component coefficients of column of the matrix $C_l$ associated to the lowest codebook index m as a WB component coefficient for simplicity. Similarly, we will refer to said column as a WB component. Now, as a result of the inclusion in the set of reported coefficients of at least one or more component coefficients of the $x_f$ columns of the matrix $C_l$ for which the corresponding codebook m index is the lowest, we have that such index (i.e., the information on the corresponding column of $W_f$) does not need to be signaled to the gNB 170. Therefore, the overhead of signaling $W_f$, quantized coefficients, and information indicating locations of significant coefficients is then reduced.

2. We propose a scheme to signal locations of additional significant component coefficients, i.e., not belonging to the $x_f$ columns of the matrix $C_l$ for which the corresponding codebook m index is the lowest. Such scheme, which exploits the sparse nature of $C_l$ after frequency compression and prunes a part of the component coefficients, e.g., the weakest, comprises one or more of the following:
   a. Selection of $L_0 \leq 2L-1$ SD components, e.g., the strongest, and a method for signaling such selection out of the 2L−1 components. The selected $L_0$ SD components may or may not be ordered according to a given metric.
   b. Selection of $M_0 \leq M - x_f$ FD components, e.g., the strongest, for each of the $L_0$ SD components and a method for signaling either a common set or $L_0$ independent sets of FD components. The selected $M_0$ FD components per SD component may or may not be ordered according to a given metric.
   c. A method for signaling information on $K_0 \leq L_0 M_0$ resulting FD component coefficients.

IV. Additional Details of Exemplary Embodiments

This section contains additional details of exemplary embodiments. In particular, the following exemplary enhancements are proposed.

IV.1. $W_2$ pre-normalization

One goal of this enhancement is to avoid any signaling related to the row corresponding to the strongest SD components of $W_2$, after frequency compression. Three steps may be performed to achieve this target. First, the index position of the strongest SD component per layer is identified (note that such value will be signaled by the UE 110 to the gNB 170). Subsequently, the following two operations are performed:
1. The whole $W_2$ matrix is pre-normalized in phase information. Accordingly, each column of the $W_2$ matrix is divided by a phase of a coefficient of that column associated to the previously-identified strongest SD component.
2. The amplitude of each coefficient associated to the strongest SD component is identically approximated as 1 (one).

As a result, one row of such pre-normalized $W_2$ matrix is composed by coefficients whose value is 1 (one), hence does not need signaling. An example of such matrix is given in equation (1), where the strongest SD component is assumed to be the first row of the $W_2$ matrix $$W_2 = \begin{bmatrix} 1 & \cdots & 1 \\ w_{2,1} & & w_{2,N_{sb}} \\ e^{j2\pi \times L w_{1,1}} & & e^{j2\pi \times L w_{1,N_{sb}}} \\ \vdots & & \vdots \end{bmatrix}, \quad (1)$$

where $\angle w_{x,y}$ is a phase of element $w_{x,y}$.

This step of phase pre-normalization is also important, since the columns of the $W_2$ matrix are formed from the dominant eigenvectors for all $N_{sb}$ subbands. By default, eigenvectors are not unique, therefore there could be an ambiguity factor (in the form of a multiplication of the eigenvector by a complex number) from one column (subband) to the other, which can result in phase jump across columns in the frequency domain. In practice, this would significantly hinder the performance of the frequency compression, as described below in reference to FIG. 3, where a significant loss is shown if such phase normalization is not performed.

This pre-normalization leads to the fact that only the information about 2L−1 beams needs to be fed back by the UE. This affects the overhead needed to signal $W_f$ as well as the overhead needed to signal information about a $C_l$ (details discussed below in reference to Proposal 2).

Figure 3:
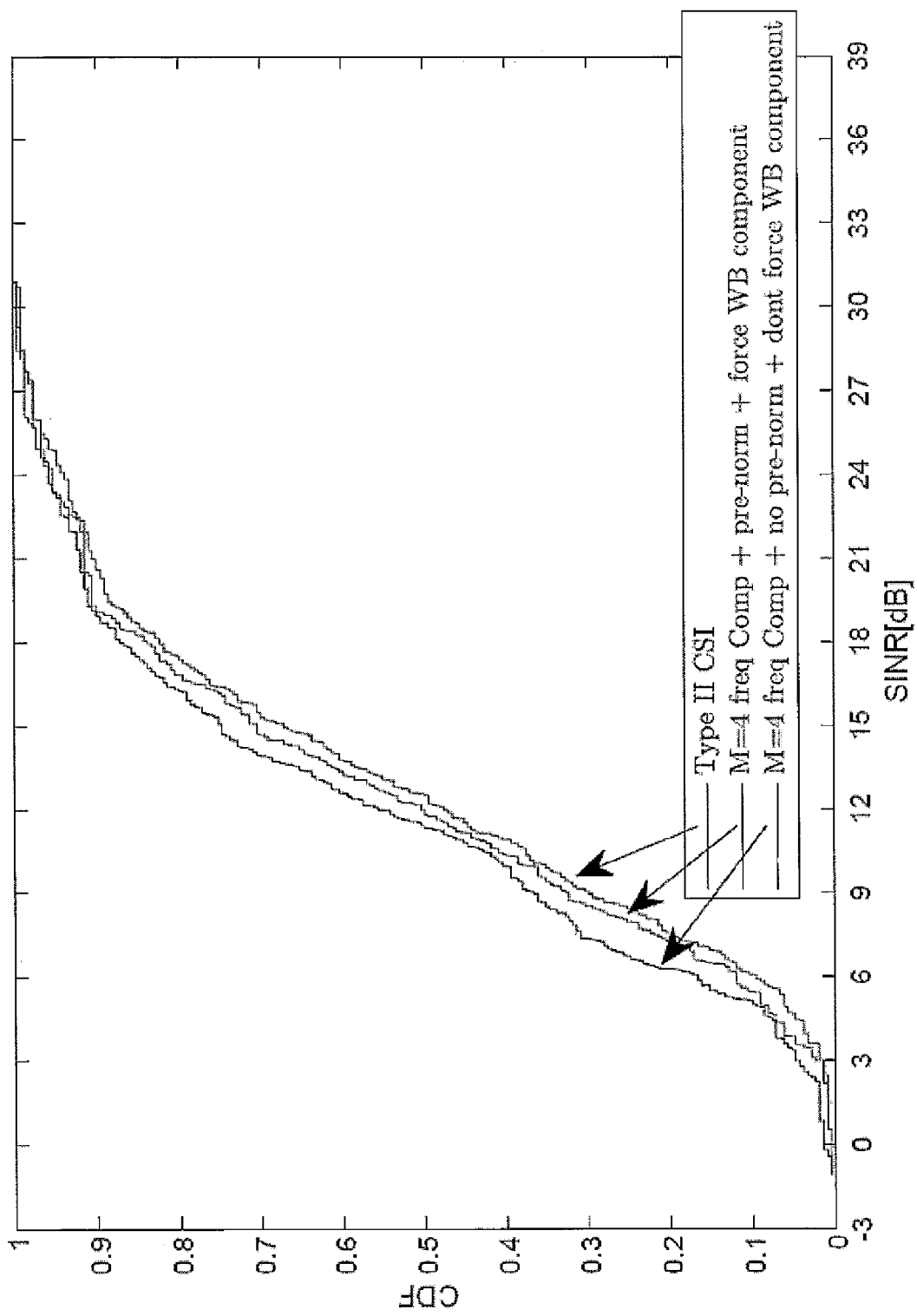
FIG. 3 illustrates a CDF of SINR (in decibels) to compare for different techniques, in accordance with exemplary embodiments.

Numerical simulations of an exemplary considered system indicate that the FD component inside $W_f$ associated to the strongest FD component of the compressed matrix $C_l$ is typically the WB component. FIG. 3 corroborates this statement by illustrating the CDF of the downlink SINR (in decibels, dB) when three different approaches are adopted:
1. The so-called Type II CSI, as per Rel. 15.
2. The exemplary embodiments disclosed herein, in which the pre-normalization is performed, and the presence of the WB component in the signaling of $C_l$ is enforced, i.e., "M=4 freq Comp+pre-norm+force WB component" (M=4 frequency compression, with pre-normalization, and with the enforced inclusion of the entire WB component in the signaling of $C_l$).
3. The exemplary embodiments disclosed herein, in which the pre-normalization is not performed and the presence of the WB component in the signaling of $C_l$ is not enforced, i.e., "M=4 freq Comp+pre-norm+don't force WB component" (M=4 frequency compression, no pre-normalization, and without enforcing the inclusion of the entire WB component in the signaling of $C_l$).

Additionally, in a first proposal (Proposal 1) in an exemplary embodiment, we propose that for all cases the WB component is present in $W_f$, and the UE signals information only on the basis vectors not including the WB component. Therefore the feedback overhead of $W_f$ is reduced to $$\left\lceil \log_2 \binom{N_{sb} - 1}{M - x_f} \right\rceil + \log_2 O_3$$

instead of $$\left\lceil \log_2 \binom{N_{sb}}{M} \right\rceil + \log_2 O_3$$

(where the term $\log_2 O_3$ refers to the necessary redundancy to feed back the information on the offset, if any, between the lowest codebook index m associated to the columns of $W_f$ and 0, e.g. the index of the WB component). Also instead of feeding back a maximum of 2LM complex coefficients per layer, up to a maximum of (2L−1) M complex coefficients are fed back per layer at the added cost of $\log_2(2L)$ per layer, realizing a minimum overhead saving of $$l \left( M - \log_2(2L) + \left\lceil \log_2 \binom{N_{sb}}{M} \right\rceil - \left\lceil \log_2 \binom{N_{sb} - 1}{M - x_f} \right\rceil \right)$$

complex coefficients, in a worst case scenario. In addition, if only a limited number of component coefficients of the matrix $C_l$ are to be fed back, this exemplary proposal reduces the overhead needed to signal to the locations of those component coefficients as well (one example to signal the locations of those coefficients is explained in Proposal 2, described below).

IV.2. Different Number of Component Coefficients Per Spatial Beam

After applying FD compression to the 2L−1 normalized rows of $W_2$ matrix, i.e., the spatial beams, the following observations can be made:

1. The relative order of amplitude of the FD components is generally different from one spatial beam to another.
2. Furthermore, after quantization, some FD component coefficients of weak beams may disappear. Strong spatial beams should be better represented, i.e., with more FD component coefficients as compared to weaker spatial beams.

This leads to a second proposal (Proposal 2), described as follows.

We propose in an exemplary embodiment that a different number of FD component coefficients per spatial beam should be reported. For the UE to signal the locations of those FD coefficients, the UE can feed back information on a bitmask of size $L_0 \times M_0$, with $L_0 \leq (2L-1)$ and $M_0 \leq (M-x_f)$. In this regard, we observe that a bitmask is a table of zeros and ones such that a one ('1') is used to indicate the presence of a selected element in the corresponding position of the table, whereas a zero ('0') is used to indicate an unselected element.

In this context, exemplary proposed steps to feed back the FD component locations are:

1. Identify $W_f$ for all spatial beams (M−1 codebook indices).
2. $x_f$ FD components for which the corresponding codebook m index is the lowest (relative to other FD components) are used for all spatial beams. Note that the value of $x_f$ can be configured beforehand (e.g., by previous agreement between UE and gNB or by specification) or can be fed back from the UE 110 or be decided on by the gNB 170.
3. For the rest of the quantized FD component coefficients, send a bitmask indicating locations of the coefficients to be fed back by a value of a bit (e.g., "1"). The signaling to feed back information on the bitmask can be performed by using at least either a bitmap of size $L_0 \times M_0$ bits (with number and position of the ones equal to the number and position of the ones in the bitmask) or a codeword/index (e.g., a bit sequence) of size $$\left\lceil \log_2 \binom{M_0 L_0}{K_0} \right\rceil$$

bits taken from a combinatorial codebook of size $$2^{\left\lceil \log_2 \binom{M_0 L_0}{K_0} \right\rceil}$$

codewords, which lists all possible combinations of the locations of $K_0$ ones in the bitmask (out of $L_0 M_0$ possible locations). As described above, such codeword serves the purpose of an index referring to a specific set of locations of the $K_0$ ones in the bitmask.

Figure 4:
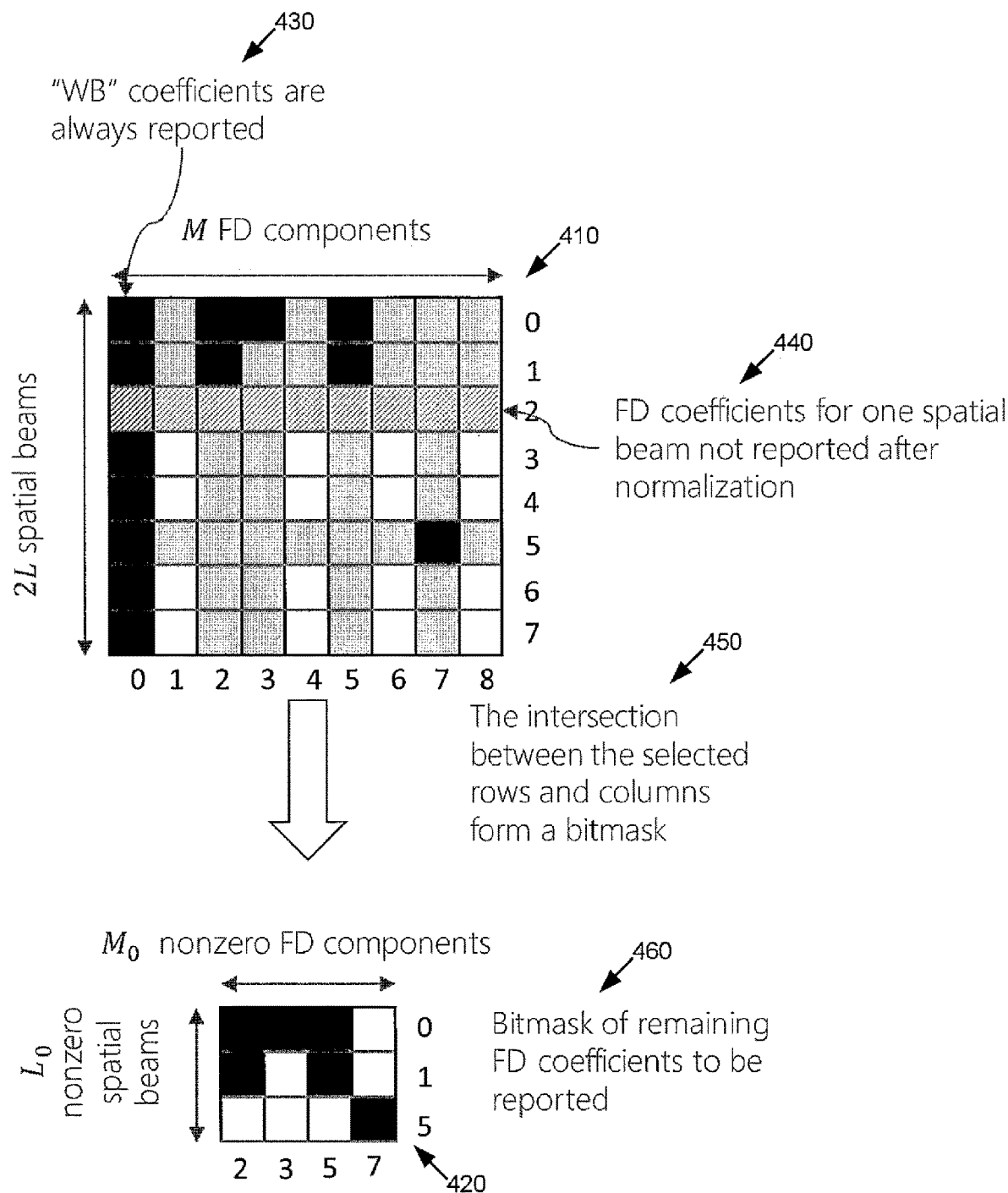
FIG. 4 illustrates a $W_2$ matrix, where certain squares indicate positions of significant coefficients, each of which matches a value of '1' in a bitmap.

FIG. 4 illustrates an example of the operations performed according to Proposals 1 and 2. The matrix 410 is the $W_2$ matrix that has been pre-normalized in phase information and the amplitude of each coefficient associated to the strongest SD component is identically approximated as 1 (one). The matrix 410 may be considered to be an indexed table, where the indexes are the M FD components in the columns, and the 2L SD beams in the rows. Certain squares indicate positions of significant coefficients, which match a value of '1' in a bitmask. As indicated by reference 430, the WB component coefficients are always reported. As indicated by reference 440, however, the FD coefficients for one spatial beam are not reported after normalization. This results in nine (9) columns and seven (7) rows, where out of M=9 columns: (i) the WB component coefficients (i.e., the first column of matrix 410) associated to the 2L−1 considered spatial beams after quantization are always reported, (ii) only $M_0$=4 additional columns were further down-selected, based on the power of the FD coefficients after quantization. In addition, out of 2L−1=7 SD beams, only $L_0$=3 SD beams were down selected for these $M_0$=4 additional columns. The significant components coefficients in the matrix 410 are as follows in (row, column) format: (0, 0); (1, 0); (3, 0); (4, 0); (5, 0); (6, 0); (7, 0); (0, 2); (0, 3); (0, 5); (1, 2); (1, 5); and (7, 5). As indicated by reference 450, the intersection of the selected rows and columns form a bitmask 420, which has the $M_0$=4 columns of 2, 3, 5, and 7 and the $L_0$=3 SD beams (as rows) of 0, 1, and 5. The bitmask size is then of size 3×4 instead of 7×8. As indicated by reference 460, the bitmask 420 is a bitmask of remaining FD coefficients to be reported (together with the reported coefficients of the $x_f$ columns associated to the lowest-valued codebook indices, out of the available M columns). The selection may be performed in different ways and is implementation-dependent. One possibility is to first select one set of $L_0$ rows and then select the retained individual FD components after quantization. Alternatively, individual components are chosen after quantization (which implicitly selects the rows/columns) These are merely exemplary and are implementation details. In an exemplary embodiment, the first column (column zero) of matrix 410 is reported (excluding the component associated to row 2, which is excluded from reporting).

A bitmask 420 is one way to indicate which FD coefficients (and corresponding nonzero spatial beams) have been selected. Another possibility is to use a codeword taken from a combinatorial codebook of size $$2^{\left\lceil \log_2 \binom{M_0 L_0}{K_0} \right\rceil}$$

codewords, which lists all possible combinations of the locations of $K_0$ ones in the bitmask (out of $L_0 M_0$ possible locations). As described above, such codeword serves the purpose of an index referring to a specific set of locations of the $K_0$ ones in the bitmask and is composed of $$\left\lceil \log_2 \binom{M_0 L_0}{K_0} \right\rceil$$

bits.

Subsequently, the entire information present in matrix/bitmask 420 is reported (including the zeros, which are represented by the clear blocks in the bitmask 420) in the form of either a bitmap (FIG. 4) or an index (e.g., a combinatorial codeword).

Regarding terminology, information on the location of zeros and ones in a bitmask 420 can be conveyed either by a bitmap (which can be seen as table of bits which replicates the bitmask) or by a combinatorial codeword, which gives one the advantage of conveying the same information with a lower number of bits but also disrupts the one-to-one relationship between bitmask and bitmap. Reference 420 in FIG. 4 is the bitmask for which one can either send a bitmap or a combinatorial codeword.

IV.3 Quantization of $K_0$ selected linear combination coefficients of matrix $C_l$ The $K_0$ linear combination coefficients of matrix $C_l$ are quantized in amplitude and phase as follows:

1. The columns of the matrix $C_l$ are first grouped in $N_G$ groups, depending on their associated codebook index m;
2. Different quantization resolutions (e.g., number of bits per quantized coefficient) and possibly different quantization step sizes are associated to each group of columns, where the quantization parameters of choice depend on the corresponding column index in a two-dimensional indexed table, and where a map between quantization resolution/step size and index of the column (in the table) is known in advance by both UE and gNB, either by previous agreement or by specification.

In the following, we summarize exemplary UE and gNB procedures.

Figure 5:
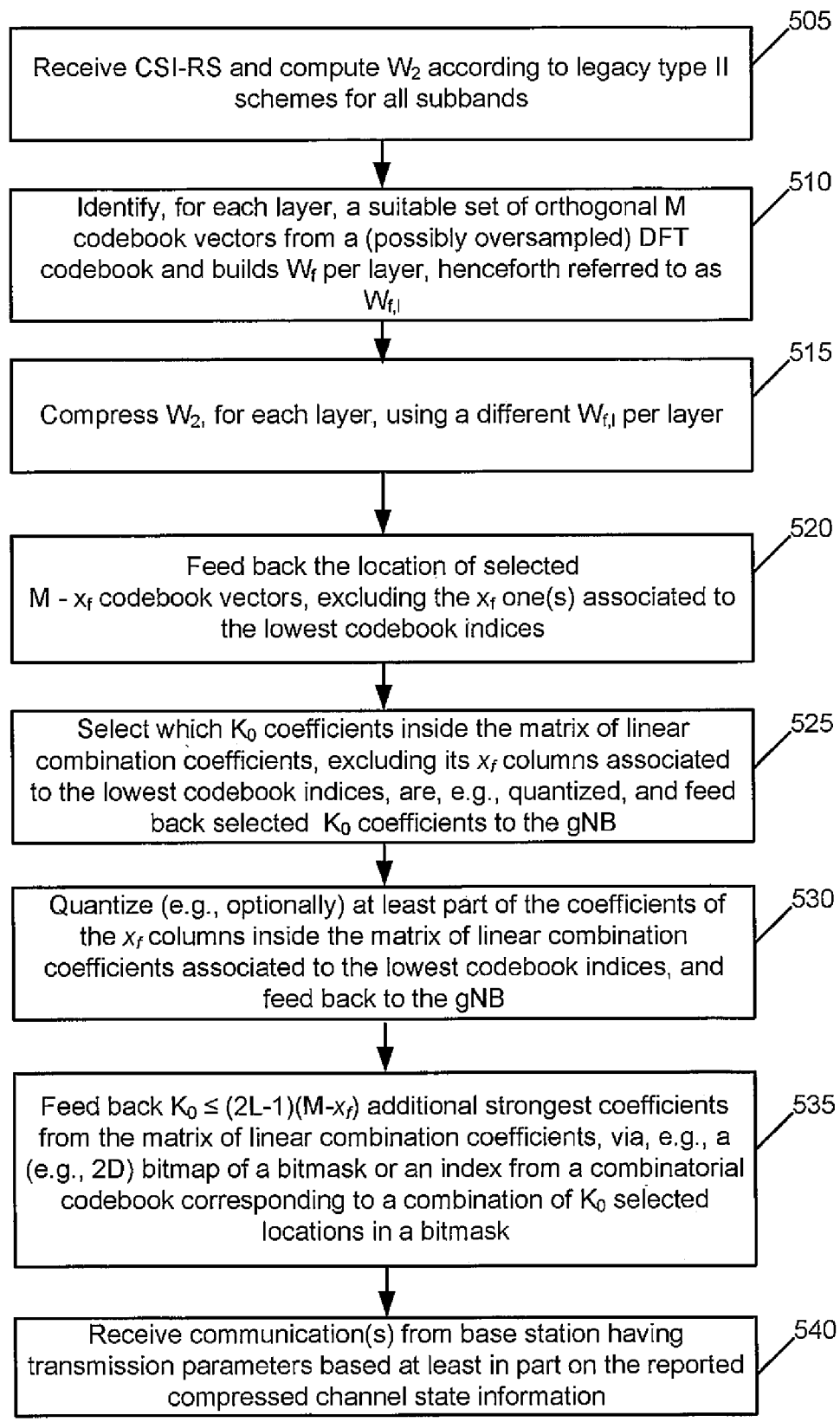
FIG. 5 is a logic flow diagram performed by a UE for enhanced frequency compression for overhead reduction for CSI reporting and usage, and illustrates the operation of an exemplary method or methods, a result of execution of computer program instructions embodied on a computer readable memory, functions performed by logic implemented in hardware, and/or interconnected means for performing functions in accordance with exemplary embodiments.

The UE 110 procedure in an exemplary embodiment is the following. Turning to FIG. 5, this figure is a logic flow diagram performed by a UE for enhanced frequency compression for overhead reduction for CSI reporting and usage. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The CSI reporting module 140 causes the UE 110 to perform the operations in the blocks of FIG. 5.

In block 505, the UE 110 receives CSI-RS and computes $W_2$ according to, e.g., legacy type II scheme for all subbands. In block 510, the UE identifies, for each layer, a suitable set of orthogonal M codebook vectors from a (possibly oversampled) DFT codebook and builds $W_f$ per layer, henceforth referred to as $W_{f,l}$.

In block 515, for each layer, the UE 110 uses a different $W_{f,l}$ per layer to compress $W_2$ to result in a matrix of linear combination coefficients:

$$C_l = W_2 W_{f,l}.$$

The UE 110 in block 520 feeds back the location of selected $M - x_f$ codebook vectors, excluding the $x_f$ one(s) associated to the lowest codebook indices (at least part of which is always signaled according to exemplary embodiments herein).

The operations in blocks 525, 530, and 535 are performed for each layer.

In block 525, the UE 110 selects which $K_0$ coefficients inside the matrix of linear combination coefficients, $C_l$ (excluding its $x_f$ columns associated to the lowest codebook indices) are, e.g., quantized and fed back to the gNB 170. Note that only up to $(2L-1)(M-x_f)$ elements are relevant for the choice of the $K_0$ ones, because the strongest SD beam inside $C_l$ can be reconstructed at the gNB as a frequency-flat unit norm SD beam.

In block 530, at least part of the coefficients of the $x_f$ columns inside the matrix of linear combination coefficients, i.e., $C_l$, associated to the lowest codebook indices are (e.g., optionally) quantized by the UE and fed back to the gNB 170.

In block 535, $K_0 \leq (2L-1)(M-x_f)$ additional strongest coefficients are selected from the remaining columns of the matrix $C_l$ and fed back via, e.g., a (e.g., two-dimensional, 2D) bitmap of a bitmask as described in Proposal 2 (see FIG. 4 also). Alternatively, the information on the location of the additional strongest coefficients may be fed back using an index from a combinatorial codebook corresponding to a combination of $K_0$ selected locations out of $L_0 M_0$ possible ones. It should be noted that at least part of the coefficients of the $x_f$ columns inside the matrix of linear combination coefficients associated to the lowest codebook indices have been reported, and therefore block 535 reports additional coefficients.

The UE 110, in block 540, receives communication(s) from the base station (e.g., gNB 170) having transmission parameters based at least in part on the reported compressed channel state information. As is known, the gNB 170 adjusts transmission parameters based on the reported CSI, although this is up to the gNB 170.

Figure 6:
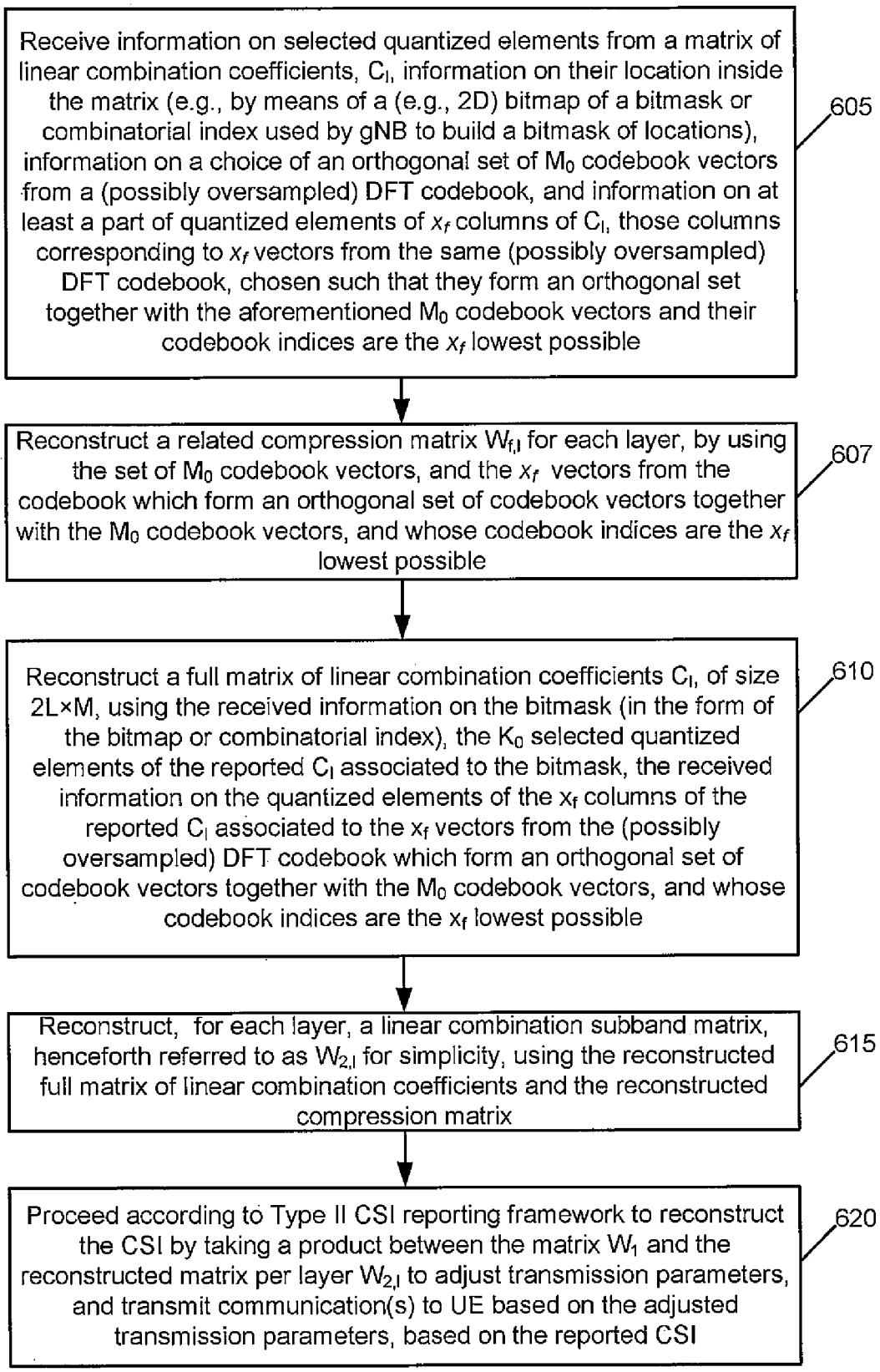
FIG. 6 is a logic flow diagram performed by a base station for enhanced frequency compression for overhead reduction for CSI reporting and usage, and illustrates the operation of an exemplary method or methods, a result of execution of computer program instructions embodied on a computer readable memory, functions performed by logic implemented in hardware, and/or interconnected means for performing functions in accordance with exemplary embodiments.

An exemplary procedure for the gNB 170 is described as follows. Turn to FIG. 6, which is a logic flow diagram performed by a base station for enhanced frequency compression for overhead reduction for CSI reporting and usage. FIG. 6 further illustrates the operation of an exemplary method or methods, a result of execution of computer program instructions embodied on a computer readable memory, functions performed by logic implemented in hardware, and/or interconnected means for performing functions in accordance with exemplary embodiments. The CSI reconstruction module 150 causes the base station (e.g., RAN node 170, possibly as a gNB) to perform the operations in the blocks of FIG. 6. This example uses a gNB 170 as a base station, although this is merely exemplary.

In block 605, the gNB receives information on selected quantized elements from a matrix of linear combination coefficients, $C_l$, information on their location inside the matrix (e.g., by means of a (e.g., 2D) bitmap of a bitmask or combinatorial index used by gNB to build a bitmask of locations), information on the choice of an orthogonal set of $M_0 - x_f$ codebook vectors from an orthogonal subset of $M \geq M_0$ codebook vectors from a (possibly oversampled) DFT codebook, and information on at least a part of the quantized elements of $x_f$ columns of $C_l$, those columns corresponding to $x_f$ vectors from the same orthogonal subset of M vectors from a (possibly oversampled) DFT codebook, chosen such that they form an orthogonal set together with the aforementioned $M_0$ codebook vectors and their codebook indices are the $x_f$ lowest possible.

In block 607, the gNB 170, for each layer, uses the $M_0$ vectors, and the $x_f$ vectors from the codebook which form an orthogonal set of codebook vectors together with the $M_0$ codebook vectors, and whose codebook indices are the $x_f$ lowest possible, to reconstruct the related compression matrix $W_{f,l}$. The $x_f$ lowest possible lowest possible codebook indices meet these conditions: 1) The chosen $x_f$ vectors from the codebook form an orthogonal set with the other $M_0$ codebook vectors; and 2) The codebook indices of the chosen $x_f$ vectors are the $x_f$ lowest possible values.

For each layer, the linear combination subband matrix, henceforth referred to as $W_{2,l}$ for simplicity, is reconstructed as follows. The gNB 170 uses (see block 610) the received information on the bitmask (in the form of a bitmap or combinatorial index), the $K_0$ selected quantized elements of the reported $C_l$ associated to the bitmask, the received information on the quantized elements of the $x_f$ columns of the reported $C_l$ associated to the $x_f$ vectors from the (possibly oversampled) DFT codebook which form an orthogonal set of codebook vectors together with the $M_0$ codebook vectors, and whose codebook indices are the $x_f$ lowest possible, to reconstruct the full matrix of linear combination coefficients $C_l$ of size 2L×M and uses this (and compression matrix $W_{f,l}$) to reconstruct (see block 615) the linear combination subband matrix, $W_{2,l}$:

$$W_{2,l} = C_l W_{f,l}^H,$$

where the H indicates Hermitian.

In block 620, the gNB 170 proceeds according to Type II CSI reporting framework (as per 3GPP Rel-15) to reconstruct the CSI by taking a product between the matrix $W_1$ and the reconstructed matrix per layer $W_{2,l}$ to adjust transmission parameters related to UE 110, based on the reported CSI. The gNB 170 may also transmit communication(s) to the UE 110 based on the adjusted transmission parameters.

V. Additional Comments

The following are additional examples.

Example 1. A method, comprising:
compressing, in a user equipment having multiple receive antennas and communicating with a base station having multiple transmit antennas, channel state information, the compressing comprising:
selecting a subset of linear combination coefficients from a two-dimensional indexed table having columns of frequency domain components and rows of spatial beams for components for a linear combination subband matrix for channel state information determination, wherein the subset is less than all of the linear combination coefficients; and
determining compressed channel state information comprising locations in the two-dimensional indexed table of the subset of linear combination coefficients and corresponding values of the linear combination coefficients at those locations; and
reporting, from the user equipment toward the base station, the compressed channel state information.

Example 2. The method of example 1, where locations of $K_0$ selected linear combination coefficients are reported using a two-dimensional bitmap corresponding to a bitmask of the locations.

Example 3. The method of example 1, where locations of $K_0$ selected linear combination coefficients are reported using an index from a combinatorial codebook corresponding to a combination of $K_0$ selected locations of a bitmask of the locations.

Example 4. The method of any of examples 2 or 3, where a size of the bitmap or combinatorial codebook is reduced by restricting a possible choice of rows and columns of the two-dimensional indexed table to less than all the rows and columns of the two-dimensional indexed table.

Example 5. The method of any of examples 2 to 4, where a size of the bitmap or combinatorial codebook is reduced by assuming a location of some of the linear combination coefficients is known in advance by the base station, prior to the reporting by the user equipment, and hence is not reported by the user equipment.

Example 6. The method of any of examples 1 to 5, where reported linear combination coefficients are quantized in amplitude and phase with a number of bits that depends on their corresponding location in the two-dimensional indexed table and where a map between quantization bits and table location is known by the base station in advance of the reporting by the user equipment.

Example 7. The method of any of examples 1 to 6, further comprising receiving one or more communications from the base station having transmission parameters based at least in part on the reported compressed channel state information.

Example 8. A method, comprising:
receiving, in a base station having multiple transmit antennas and from a user equipment having multiple receive antennas, reporting of compressed channel state information comprising locations in a two-dimensional indexed table of a subset of linear combination coefficients from two-dimensional indexed table and corresponding values of the linear combination coefficients at those locations, the two-dimensional indexed table having columns of frequency domain components and rows of spatial beams for components for a linear combination subband matrix for channel state information determination, wherein the subset is less than all of the linear combination coefficients; and
reconstructing channel state information from the compressed channel state information by using at least the locations in the two-dimensional indexed table and the corresponding values of the linear combination coefficients at those locations to determine at least part of the two-dimensional indexed table.

Example 9. The method of example 8, where the locations of $K_0$ selected linear combination coefficients are reported using a two-dimensional bitmap corresponding to a bitmask of the locations.

Example 10. The method of example 8, where locations of $K_0$ selected linear combination coefficients are reported using an index from a combinatorial codebook corresponding to a combination of $K_0$ selected locations of a bitmask of the locations.

Example 11. The method of any of examples 9 or 10, where a size of the bitmap or combinatorial codebook is reduced by restricting a possible choice of rows and columns of the two-dimensional indexed table to less than all the rows and columns of the two-dimensional indexed table.

Example 12. The method of any of examples 9 to 11, where a size of the bitmap or combinatorial codebook is reduced by assuming a location of some of the linear combination coefficients is known in advance by the base station, prior to the reporting by the user equipment, and hence is not reported by the user equipment.

Example 13. The method of any of examples 8 to 12, where reported linear combination coefficients are quantized in amplitude and phase with a number of bits that depends on their corresponding location in the two-dimensional indexed table and where a map between quantization bits and table location is known by the base station in advance of the reporting by the user equipment.

Example 14. The method of any of examples 8 to 13, further comprising transmitting to the user equipment one or more communications having transmission parameters based at least in part on the reconstructed channel state information.

Example 15. A computer program, comprising code for performing the methods of any of examples 1 to 14, when the computer program is run on a processor.

Example 16. The computer program according to example 15, wherein the computer program is a computer program product comprising a computer-readable medium bearing computer program code embodied therein for use with a computer.

Example 17. The computer program according to example 15, wherein the program is directly loadable into an internal memory of the computer.

Example 18. A computer program product comprising a computer-readable storage medium bearing computer program code embodied therein for use with a computer, the computer program code comprising code for performing the methods of any of examples 1 to 14.

Example 19. An apparatus, comprising:
means for compressing, in a user equipment having multiple receive antennas and communicating with a base station having multiple transmit antennas, channel state information, the compressing comprising:
means for selecting a subset of linear combination coefficients from a two-dimensional indexed table having columns of frequency domain components and rows of spatial beams for components for a linear combination subband matrix for channel state information determination, wherein the subset is less than all of the linear combination coefficients; and
means for determining compressed channel state information comprising locations in the two-dimensional indexed table of the subset of linear combination coefficients and corresponding values of the linear combination coefficients at those locations; and
means for reporting, from the user equipment toward the base station, the compressed channel state information.

Example 20. The apparatus of example 19, where locations of $K_0$ selected linear combination coefficients are reported using a two-dimensional bitmap corresponding to a bitmask of the locations.

Example 21. The apparatus of example 19, where locations of $K_0$ selected linear combination coefficients are reported using an index from a combinatorial codebook corresponding to a combination of $K_0$ selected locations of a bitmask of the locations.

Example 22. The apparatus of any of examples 20 or 21, where a size of the bitmap or combinatorial codebook is reduced by restricting a possible choice of rows and columns of the two-dimensional indexed table to less than all the rows and columns of the two-dimensional indexed table.

Example 23. The apparatus of any of examples 20 to 22, where a size of the bitmap or combinatorial codebook is reduced by assuming a location of some of the linear combination coefficients is known in advance by the base station, prior to the reporting by the user equipment, and hence is not reported by the user equipment.

Example 24. The apparatus of any of examples 19 to 23, where reported linear combination coefficients are quantized in amplitude and phase with a number of bits that depends on their corresponding location in the two-dimensional indexed table and where a map between quantization bits and table location is known by the base station in advance of the reporting by the user equipment.

Example 25. The apparatus of any of examples 19 to 24, further comprising means for receiving one or more communications from the base station having transmission parameters based at least in part on the reported compressed channel state information.

Example 26. An apparatus, comprising:
means for receiving, in a base station having multiple transmit antennas and from a user equipment having multiple receive antennas, reporting of compressed channel state information comprising locations in a two-dimensional indexed table of a subset of linear combination coefficients from two-dimensional indexed table and corresponding values of the linear combination coefficients at those locations, the two-dimensional indexed table having columns of frequency domain components and rows of spatial beams for components for a linear combination subband matrix for channel state information determination, wherein the subset is less than all of the linear combination coefficients; and
means for reconstructing channel state information from the compressed channel state information by using at least the locations in the two-dimensional indexed table and the corresponding values of the linear combination coefficients at those locations to determine at least part of the two-dimensional indexed table.

Example 27. The apparatus of example 26, where the locations of $K_0$ selected linear combination coefficients are reported using a two-dimensional bitmap corresponding to a bitmask of the locations.

Example 28. The apparatus of example 26, where locations of $K_0$ selected linear combination coefficients are reported using an index from a combinatorial codebook corresponding to a combination of $K_0$ selected locations of a bitmask of the locations.

Example 29. The apparatus of any of examples 27 or 28, where a size of the bitmap or combinatorial codebook is reduced by restricting a possible choice of rows and columns of the two-dimensional indexed table to less than all the rows and columns of the two-dimensional indexed table.

Example 30. The apparatus of any of examples 27 to 29, where a size of the bitmap or combinatorial codebook is reduced by assuming a location of some of the linear combination coefficients is known in advance by the base station, prior to the reporting by the user equipment, and hence is not reported by the user equipment.

Example 31. The apparatus of any of examples 26 to 30, where reported linear combination coefficients are quantized in amplitude and phase with a number of bits that depends on their corresponding location in the two-dimensional indexed table and where a map between quantization bits and table location is known by the base station in advance of the reporting by the user equipment.

Example 32. The apparatus of any of examples 26 to 31, further comprising means for transmitting to the user equipment one or more communications having transmission parameters based at least in part on the reconstructed channel state information.

Example 33. An apparatus, comprising:
at least one processor; and
at least one memory including computer program code,
the at least one memory and the computer program code configured, with the at least one processor, to cause the apparatus to perform operations comprising:
compressing, in a user equipment having multiple receive antennas and communicating with a base station having multiple transmit antennas, channel state information, the compressing comprising:
selecting a subset of linear combination coefficients from a two-dimensional indexed table having columns of frequency domain components and rows of spatial beams for components for a linear combination subband matrix for channel state information determination, wherein the subset is less than all of the linear combination coefficients; and determining compressed channel state information comprising locations in the two-dimensional indexed table of the subset of linear combination coefficients and corresponding values of the linear combination coefficients at those locations; and reporting, from the user equipment toward the base station, the compressed channel state information.

Example 34. The apparatus of example 33, where locations of $K_0$ selected linear combination coefficients are reported using a two-dimensional bitmap corresponding to a bitmask of the locations.

Example 35. The apparatus of example 33, where locations of $K_0$ selected linear combination coefficients are reported using an index from a combinatorial codebook corresponding to a combination of $K_0$ selected locations of a bitmask of the locations.

Example 36. The apparatus of any of examples 34 or 35, where a size of the bitmap or combinatorial codebook is reduced by restricting a possible choice of rows and columns of the two-dimensional indexed table to less than all the rows and columns of the two-dimensional indexed table.

Example 37. The apparatus of any of examples 34 to 36, where a size of the bitmap or combinatorial codebook is reduced by assuming a location of some of the linear combination coefficients is known in advance by the base station, prior to the reporting by the user equipment, and hence is not reported by the user equipment.

Example 38. The apparatus of any of examples 33 to 37, where reported linear combination coefficients are quantized in amplitude and phase with a number of bits that depends on their corresponding location in the two-dimensional indexed table and where a map between quantization bits and table location is known by the base station in advance of the reporting by the user equipment.

Example 39. The apparatus of any of examples 33 to 38, wherein the at least one memory and the computer program code are further configured, with the at least one processor, to cause the apparatus to perform operations comprising: receiving one or more communications from the base station having transmission parameters based at least in part on the reported compressed channel state information.

Example 40. An apparatus, comprising:
at least one processor; and
at least one memory including computer program code, the at least one memory and the computer program code configured, with the at least one processor, to cause the apparatus to perform operations comprising:
receiving, in a base station having multiple transmit antennas and from a user equipment having multiple receive antennas, reporting of compressed channel state information comprising locations in a two-dimensional indexed table of a subset of linear combination coefficients from two-dimensional indexed table and corresponding values of the linear combination coefficients at those locations, the two-dimensional indexed table having columns of frequency domain components and rows of spatial beams for components for a linear combination subband matrix for channel state information determination, wherein the subset is less than all of the linear combination coefficients; and
reconstructing channel state information from the compressed channel state information by using at least the locations in the two-dimensional indexed table and the corresponding values of the linear combination coefficients at those locations to determine at least part of the two-dimensional indexed table.

Example 41. The apparatus of example 40, where the locations of $K_0$ selected linear combination coefficients are reported using a two-dimensional bitmap corresponding to a bitmask of the locations.

Example 42. The apparatus of example 40, where locations of $K_0$ selected linear combination coefficients are reported using an index from a combinatorial codebook corresponding to a combination of $K_0$ selected locations of a bitmask of the locations.

Example 43. The apparatus of any of examples 41 or 42, where a size of the bitmap or combinatorial codebook is reduced by restricting a possible choice of rows and columns of the two-dimensional indexed table to less than all the rows and columns of the two-dimensional indexed table.

Example 44. The apparatus of any of examples 41 to 43, where a size of the bitmap or combinatorial codebook is reduced by assuming a location of some of the linear combination coefficients is known in advance by the base station, prior to the reporting by the user equipment, and hence is not reported by the user equipment.

Example 45. The apparatus of any of examples 40 to 44, where reported linear combination coefficients are quantized in amplitude and phase with a number of bits that depends on their corresponding location in the two-dimensional indexed table and where a map between quantization bits and table location is known by the base station in advance of the reporting by the user equipment.

Example 46. The apparatus of any of examples 40 to 45, wherein the at least one memory and the computer program code are further configured, with the at least one processor, to cause the apparatus to perform operations comprising: transmitting to the user equipment one or more communications having transmission parameters based at least in part on the reconstructed channel state information.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method comprising:
    selecting, by a user equipment, a subset of linear combination coefficients from a two-dimensional matrix having columns of frequency domain components and rows of spatial beams components for channel state information determination, wherein the number of linear combination coefficients in the subset is less than all of the linear combination coefficients;
    determining a compression matrix comprising frequency components, wherein the compression matrix comprises information associated with column indices of the selected subset of linear combination coefficients, and the compression matrix excludes the index of the column with lowest index of the two-dimensional matrix;
    determining compressed channel state information which comprises (i) locations of the subset of linear combination coefficients in the two-dimensional matrix, (ii) corresponding values of the linear combination coefficients at those locations, wherein the linear combination coefficients at those locations comprises linear combination coefficients associated with the column with lowest index of the two-dimensional matrix, and (iii) the compression matrix; and
    reporting, from the user equipment toward a base station, the compressed channel state information.

2. The method of claim 1, wherein the locations of the subset of linear combination coefficients in the two-dimensional matrix are reported using a two-dimensional bitmap, and wherein bits set to 1 in the bitmap indicate the locations of the linear combination coefficients being reported.

3. The method of claim 1, wherein the linear combination coefficients combine with codebook vectors selected from the columns of two discrete Fourier transformation matrices to indicate a preferred precoding vector.

4. The method of claim 1, wherein the subset of linear combination coefficients are quantized in amplitude and phase with a number of bits that depends on their corresponding location in the two-dimensional matrix and where a map between quantization bits and two-dimensional matrix location is known by the base station in advance of the reporting by the user equipment.

5. The method of claim 1, wherein the column with lowest index of the two-dimensional matrix corresponds to frequency domain component 0 and the frequency domain component 0 is always present in the compressed channel state information.

6. The method of claim 1, wherein the corresponding values of the linear combination coefficients at those locations comprise values of amplitude and phase of the linear combination coefficients at those locations.

7. An apparatus, comprising:
    at least one processor; and
    at least one memory including computer program code,
    the at least one memory and the computer program code configured to, with the at least one processor, cause the apparatus to at least:
    select a subset of linear combination coefficients from a two-dimensional matrix having columns of frequency domain components and rows of spatial beams components for channel state information determination, wherein the number of linear combination coefficients in the subset is less than all of the linear combination coefficients;
    determine a compression matrix comprising frequency components, wherein the compression matrix comprises information associated with column indices of the selected subset of linear combination coefficients, and the compression matrix excludes the index of the column with lowest index of the two-dimensional matrix;
    determine compressed channel state information which comprises (i) locations of the subset of linear combination coefficients in the two-dimensional matrix, (ii) corresponding values of the linear combination coefficients at those locations, wherein the linear combination coefficients at those locations comprises linear combination coefficients associated with the column with lowest index of the two-dimensional matrix, and (iii) the compression matrix; and
    report, toward a base station, the compressed channel state information.

8. The apparatus of claim 7, wherein the locations of the subset of linear combination coefficients in the two-dimensional matrix are reported using a two-dimensional bitmap, and wherein bits set to 1 in the bitmap indicate the locations of the linear combination coefficients being reported.

9. The apparatus of claim 8, where a size of the bitmap is reduced by at least one of: restricting a possible choice of rows and columns of the two-dimensional matrix to less than all the rows and columns of the two-dimensional matrix, and assuming a location of one or more of the linear combination coefficients is known in advance by the base station, prior to the reporting, and is not reported by the apparatus.

10. The apparatus of claim 7, wherein the linear combination coefficients combine with codebook vectors selected from the columns of two discrete Fourier transformation matrices to indicate a preferred precoding vector.

11. The apparatus of claim 10, wherein column indices of the selected subset of linear combination coefficients from the two-dimensional matrix are associated to corresponding columns of one of the two discrete Fourier transformation matrices.

12. The apparatus of claim 7, wherein the subset of linear combination coefficients are quantized in amplitude and phase with a number of bits that depends on their corresponding location in the two-dimensional matrix and where a map between quantization bits and two-dimensional matrix location is known by the base station in advance of the reporting by the apparatus.

13. The apparatus of claim 7, wherein the column with lowest index of the two-dimensional matrix corresponds to frequency domain component 0 and the frequency domain component 0 is always present in the compressed channel state information.

14. The apparatus of claim 7, wherein the corresponding values of the linear combination coefficients at those locations comprise values of amplitude and phase of the linear combination coefficients at those locations.

15. An apparatus, comprising:
at least one processor; and
at least one memory including computer program code,
the at least one memory and the computer program code configured, with the at least one processor, to cause the apparatus to at least:
receive, from a user equipment, reporting of compressed channel state information comprising (i) locations of a subset of linear combination coefficients in a two-dimensional matrix, the two-dimensional matrix having columns of frequency domain components and rows of spatial beams components for channel state information determination, wherein the number of linear combination coefficients in the subset is less than all of the linear combination coefficients, (ii) corresponding values of the linear combination coefficients at those locations, wherein the linear combination coefficients at those locations comprises linear combination coefficients associated with the column with lowest index of the two-dimensional matrix, (iii) a compression matrix comprising frequency components, the compression matrix comprises information associated with column indices of the subset of linear combination coefficients from the two-dimensional matrix, wherein the compression matrix excludes the index of the column with lowest index of the two-dimensional matrix; and
reconstruct channel state information from the compressed channel state information.

16. The apparatus of claim 15, wherein the locations of the subset of linear combination coefficients in the two-dimensional matrix are reported using a two-dimensional bitmap, and wherein bits set to 1 indicate the locations of the linear combination coefficients being reported.

17. The apparatus of claim 15, wherein the linear combination coefficients combine with codebook vectors selected from the columns of two discrete Fourier transformation matrices to indicate a preferred precoding vector.

18. The apparatus of claim 15, wherein the reported linear combination coefficients are quantized in amplitude and phase with a number of bits that depends on their corresponding location in the two-dimensional matrix and wherein a map between quantization bits and two-dimensional matrix location is known by the apparatus in advance of the reporting by the user equipment.

19. The apparatus of claim 15, wherein the column with lowest index of the two-dimensional matrix corresponds to frequency domain component 0 and the frequency domain component 0 is always present in the compressed channel state information.

20. The apparatus of claim 15, wherein the corresponding values of the linear combination coefficients at those locations comprise values of amplitude and phase of the linear combination coefficients at those locations.

\* \* \* \* \*